United States Patent [19]

Reuter et al.

[11] Patent Number: 5,211,218
[45] Date of Patent: May 18, 1993

[54] MELTING AND CASTING PLANT CHAMBER

[75] Inventors: Wolfgang Reuter, Niddatal; Josef Gediga, Bruchkoebel, both of Fed. Rep. of Germany

[73] Assignee: Leybold Aktiengesellschaft, Fed. Rep. of Germany

[21] Appl. No.: 724,432

[22] Filed: Jun. 28, 1991

Related U.S. Application Data

[63] Continuation of Ser. No. 379,268, Jul. 13, 1989, abandoned.

[30] Foreign Application Priority Data

Dec. 30, 1988 [DE] Fed. Rep. of Germany ....... 3844273

[51] Int. Cl.⁵ .............................................. B22D 47/00
[52] U.S. Cl. .................................. 164/313; 164/256; 164/258; 164/259
[58] Field of Search ................. 164/48, 492, 493, 494, 164/495, 250.1, 512, 513, 514, 61, 253, 254, 258, 256, 257, 159; 373/110, 141; 219/7.5, 10.57, 10.67, 10.75

[56] References Cited

U.S. PATENT DOCUMENTS

| | | | |
|---|---|---|---|
| 2,713,183 | 7/1955 | Winkler | 164/258 |
| 2,825,945 | 3/1958 | Ulrech | 164/258 |
| 2,966,709 | 1/1961 | Ruppel | 164/258 |
| 3,635,791 | 1/1972 | Bly | 164/258 |
| 4,139,341 | 2/1979 | Pfaffenbauer | 432/184 |
| 4,741,384 | 5/1988 | Healey | 165/258 |
| 4,773,079 | 9/1988 | Brückmann | 373/141 |

FOREIGN PATENT DOCUMENTS

| | | |
|---|---|---|
| 3239146 | 4/1984 | Fed. Rep. of Germany . |
| 1361615 | 4/1964 | France ................ 164/254 |

Primary Examiner—Richard K. Seidel
Assistant Examiner—Rex E. Pento
Attorney, Agent, or Firm—Hill, Steadman & Simpson

[57] ABSTRACT

A melting and casting plant for operation at least under a vacuum and having a vacuum chamber. A wall of the vacuum chamber of the plant is angularly fashioned and is composed of a stationary part and of a swivellable part, the swivellable part being hinged to the stationary part. A door (ingot mold door) is provided in the swivellable part. The shape of the chamber wall and a linking axis of the swivellable part are fashioned or arranged, such that, when the chamber is opened, articles situated in the interior of the chamber are readily accessible. In comparison to the prior art, improved operations of the system, particularly regarding the chamber, is possible.

12 Claims, 8 Drawing Sheets

MELTING AND CASTING PLANT CHAMBER

This is a continuation of application Ser. No. 379,268, filed Jul. 13, 1989, now abandoned.

BACKGROUND OF THE INVENTION

The present invention is directed to a melting and casting plant for operation under a vacuum, a protective gas atmosphere or normal atmosphere. The plant has a chamber for a melting and casting means, preferably an inductively heated melting crucible and one or more ingot molds loadable onto a turntable and/or elevating platform, the chamber having a bipartite wall with a part of the wall being pivotable.

Melting and casting systems are utilized in vacuum processing technology for research and development and for production. The critical component parts of these systems are a vacuum chamber, a pump and an energy supply system with a control unit. Such systems can be operated under a high-vacuum, under a protective gas atmosphere or in normal atmosphere.

Such a melting and casting plant is described, for example, in the brochure of Leybold AG "IS 001 Labor-Induktions-Schmeltz-und Giess-Anlag", number 31-140.21.

SUMMARY OF THE INVENTION

The present invention has the following objects: easy accessibility to all parts of the chamber is achieved; reworking with an opened chamber is simplified; the introduction, attachment and mounting and removal of equipment in the chamber is simplified. In very general terms, a simplified handling of all parts is possible.

It is also an object of the present invention to provide for the maintenance and cleaning of the chamber and of the parts accommodated therein in an easy and economical manner. In particular, an easy coil changing is possible. Furthermore, the loading and unloading of the chamber, particularly of the ingot molds located in the chamber, as well as the tamping of a crucible can be carried out quickly, simply and effectively.

The stated objects are inventively achieved by a chamber wall which is fashioned angularly and is composed of a stationary part and of a part that can be swivelled out, the part that can be swivelled out being hinged to the stationary part. The shape of the chamber wall and a linking axis are fashioned and arranged such that, after the moveable part of the chamber wall has been swivelled out, the articles located in the interior of the chamber, to be introduced into the interior of the chamber, to be removed therefrom or to be treated therein can be easily manipulated or are accessible for loading and unloading.

It has proven especially beneficial that the shape of the chamber wall and the link axis are fashioned or arranged such that, after the moveable part of the chamber wall has been swivelled out, the interior of the chamber is accessible from different directions.

An especially easy accessibility of all locations and articles in the interior of the chamber is achieved in that the ground plan of the chamber has a rectangular or approximately rectangular shape. For the same reason the chamber can be fashioned cuboid-like or approximately cuboid-like.

It is a feature of the present invention that all parts located in the chamber are exposed when the five walls of the approximately cuboid-like chamber, which form a trough-shaped unit, is hinged to a sixth wall and is swivelled out around a vertically oriented axis.

In order to achieve an easy loadability and unloadability of the ingot molds, it is a further feature of the present invention that a door (ingot mold door) is located in that part of the wall of the chamber that can be swivelled out, this door also being preferably capable of being swivelled out around a vertically arranged swivelling axis.

The door which is hinged to that part of the wall of the chamber that can be swivelled out is provided with a hinge axis that is positioned in the proximity of the part of the wall of the chamber that is stationary. It occupies this position only when the part of the wall of the chamber that can be swivelled out is not swivelled out.

As an alternative, the door which is hinged to that part of the wall of the chamber that can be swivelled out can have a hinge axis on a wall of the part of the chamber that can be swivelled out which is at a set distance from the stationary wall. This means that when the moveable part of the chamber is swiveled out, the door moves away from the stationary part of the chamber.

The following advantages are achieved with the present invention. The overall handling of the installation, particularly of the chamber and of the articles, individual units, and materials in the chamber, is considerably improved. An easier coil changing is possible. The loading and unloading of the ingot molds can be more reasonably designed. The tamping of the crucible becomes easier. In very general terms, an accessibility to all parts in the chamber is considerably simpler in comparison to the prior art.

Further details of the invention may be derived from the following description of an exemplary embodiment of the present invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability, but is most advantageously utilized in an induction melting and casting plant. The present invention is an improvement over the prior art plant of FIG. 1 which is described below and illustrates the problem in the prior art which the present invention overcomes.

Figure 1:
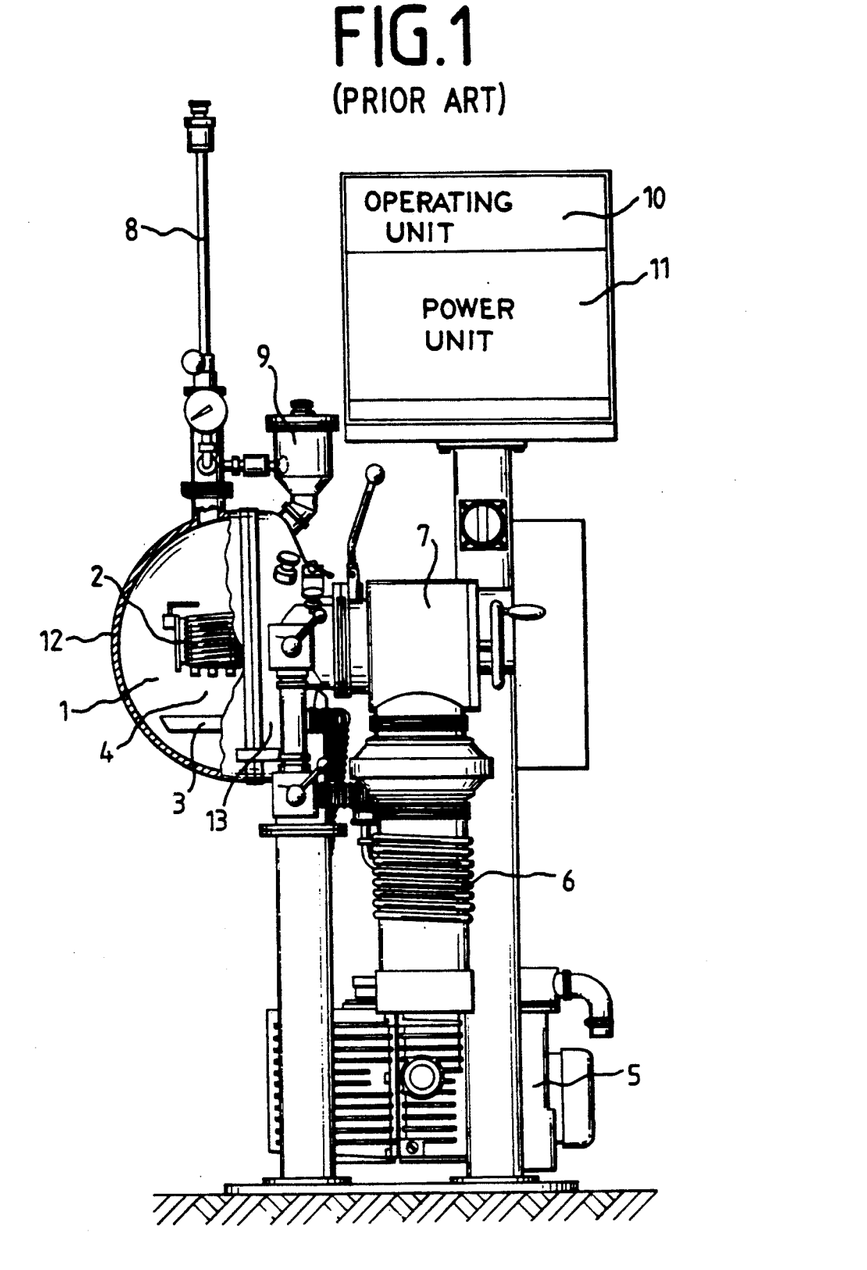
FIG. 1 shows a side view of a prior art induction melting and casting plant.

A chamber 1 in which an induction coil 2 is accommodated is depicted in FIG. 1. The induction coil 2 surrounds a melting crucible that is not visible because the melting crucible is located inside the coil 2. A table 3 in the chamber 1 supports one or more ingot molds. After the table 3 is loaded, the ingot molds would be situated in position 4. By charging the induction coil 2 with current, material in the melting crucible is melted and is then cast into the ingot molds located on the table, by a special known device.

A vacuum rotary disk pump 5 and a vacuum oil diffusion pump 6 are also provided and establish the vacuum required for the implementation of the melting and casting process. A high-vacuum valve 7 is provided which places the chamber 1 under vacuum. Also included is a temperature measuring means 8, a charging mechanism 9, an operating unit 10 for the overall system and a supply unit 11 which provides the melting power for the plant.

Figure 4:
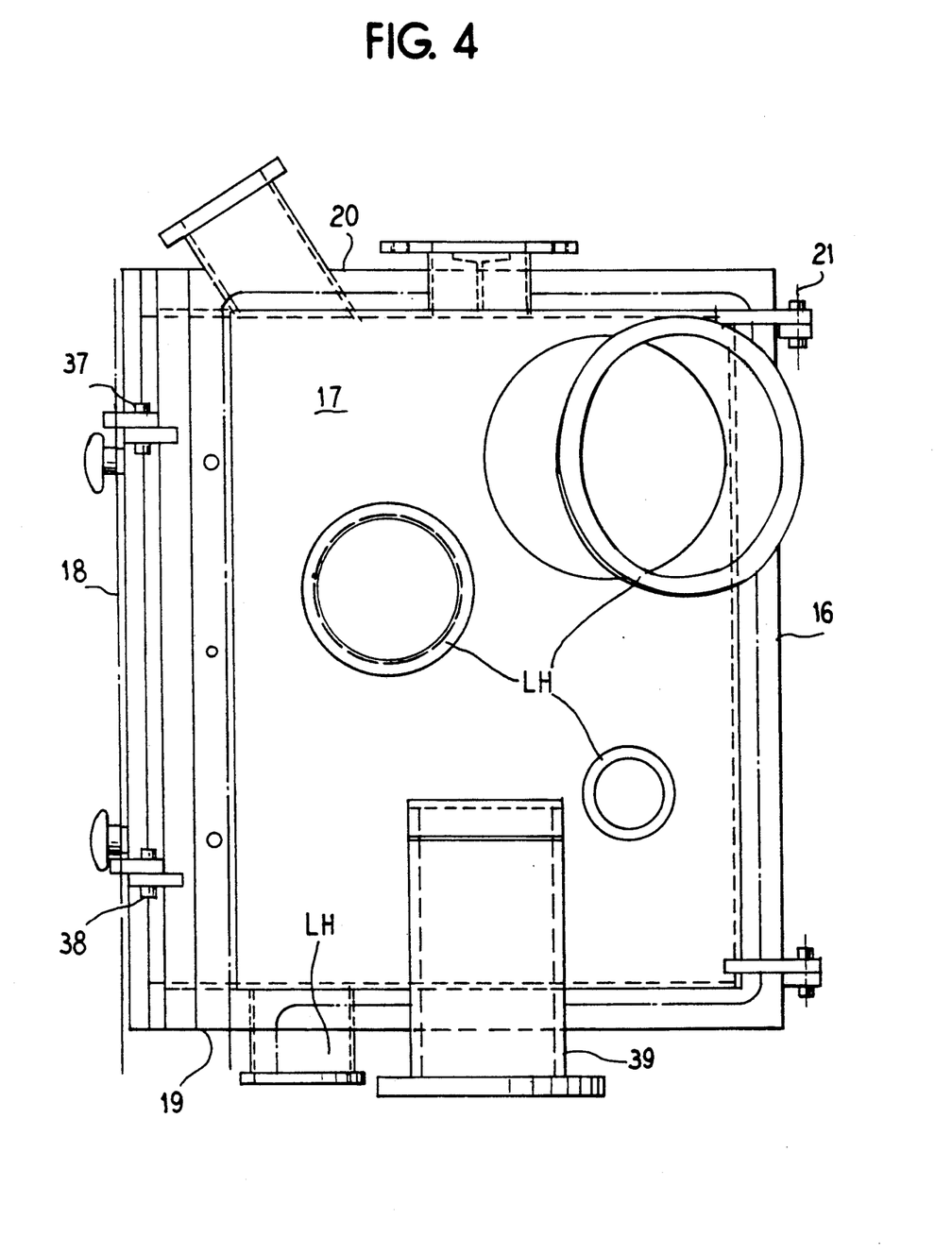
FIG. 4 is a side view of one embodiment of the chamber of the present invention.
Figure 5:
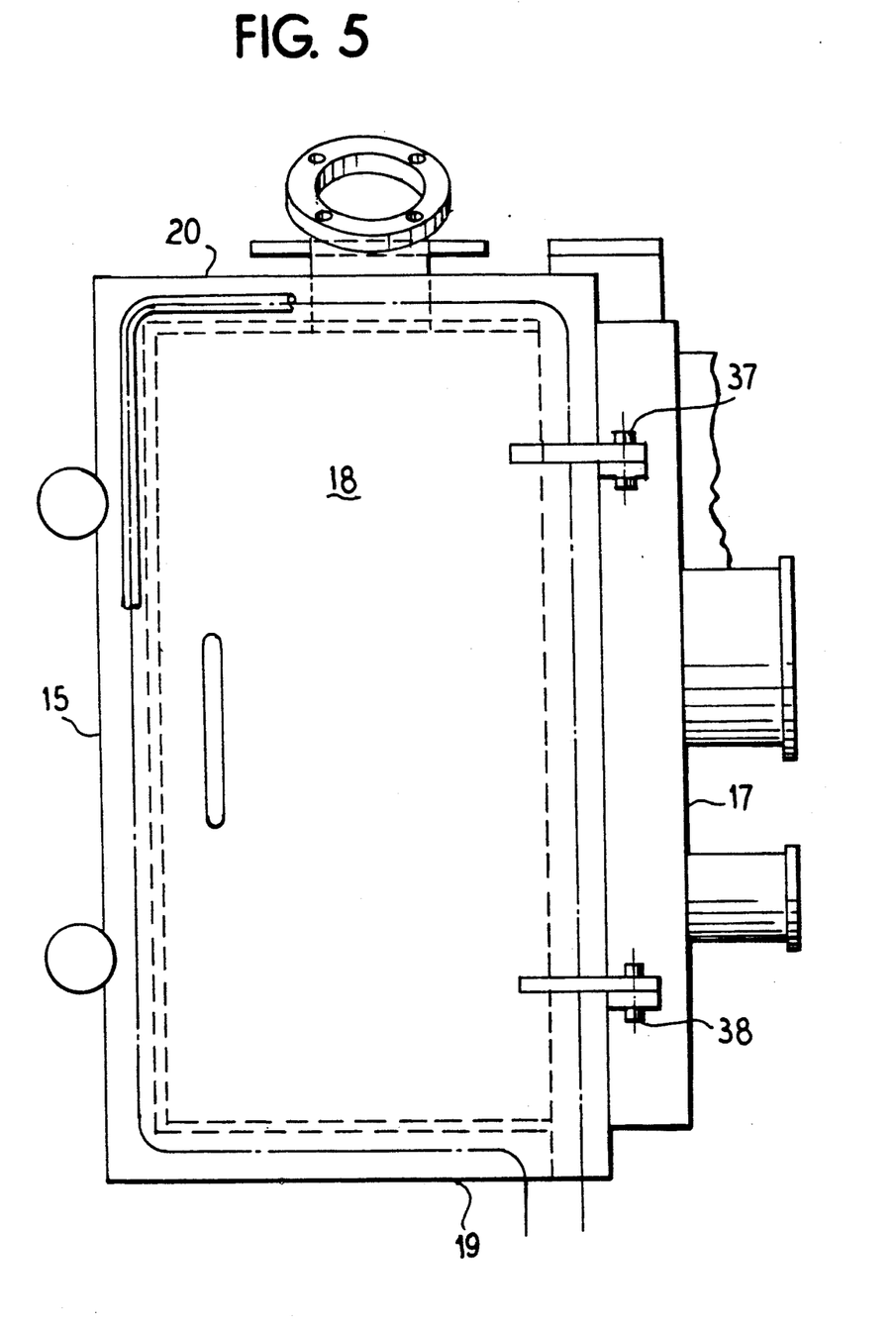
FIG. 5 is a front view of the FIG. 4 chamber.
Figure 6:
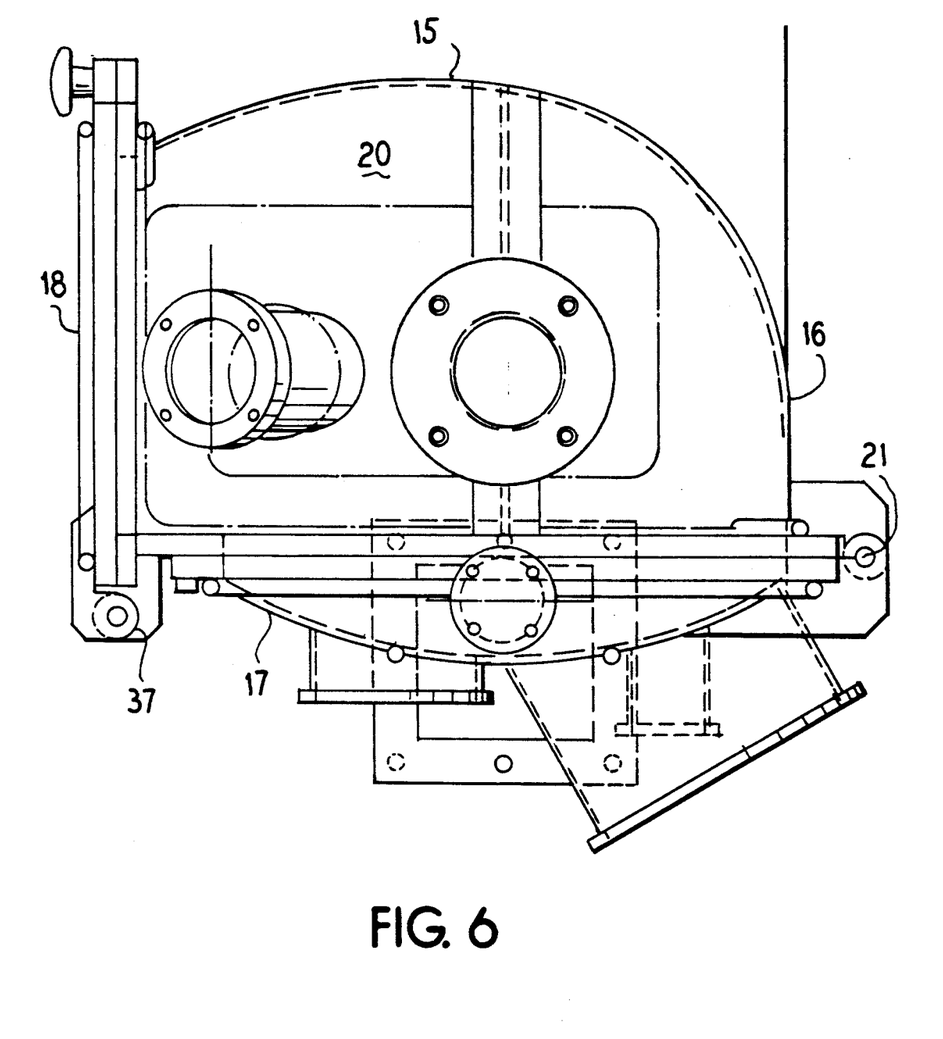
FIG. 6 is a top view of the FIG. 4 chamber.

The chamber 1 in the prior art plant is composed of two parts 12, 13. The part 12 can be swivelled away from the stationary part 13. Whereas the chamber 1 depicted in Figure 1 has essentially a spherical form, the chamber 14 in the exemplary embodiment of the present invention (see FIGS. 2, 3, 7 and 8) is angular, being especially fashioned approximately cuboid-shaped. FIGS. 4, 5 and 6 illustrate an alternative embodiment of the chamber of the present invention.

Figure 3:
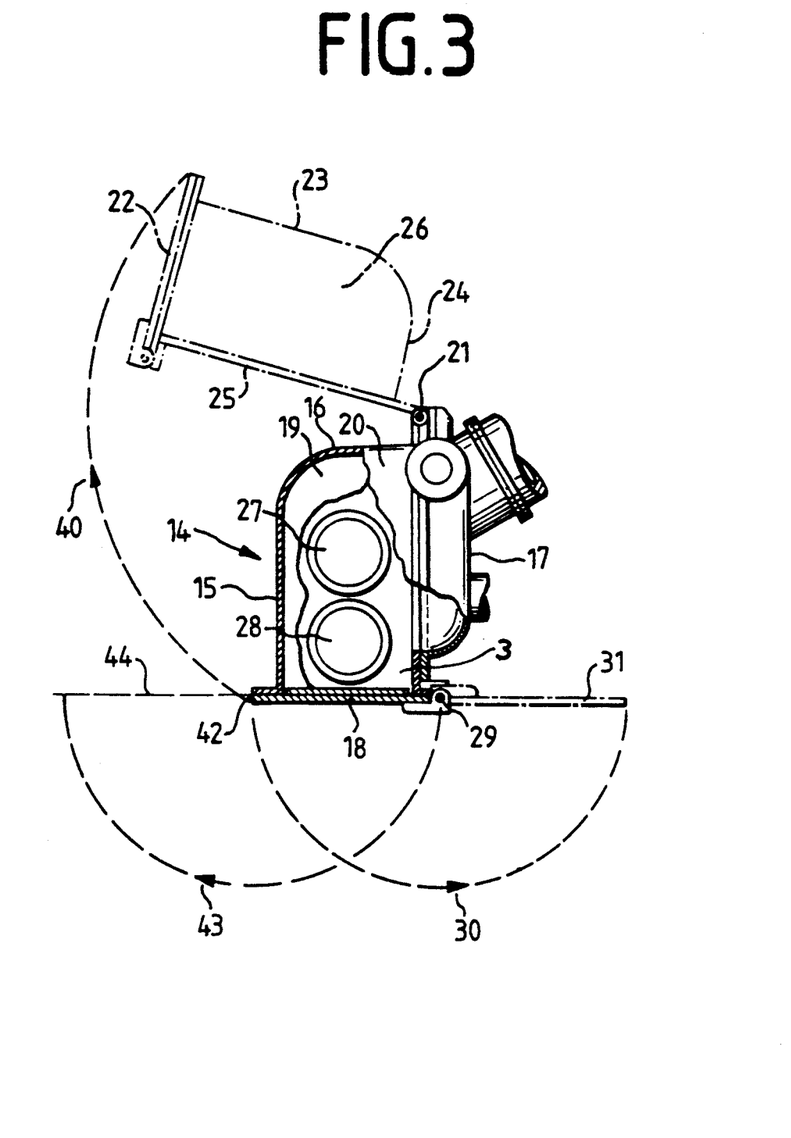
FIG. 3 shows a simplified illustration of the chamber of FIG. 2 in a view from above and partially cut away.

FIG. 3 has been simplified for illustrating the critical chamber parts of the present invention. Those parts not critical to the present invention have been omitted and only the chamber itself has been shown. A view from above has been selected, whereby the cover of the chamber has been mainly omitted in order to permit an unobstructed view into the interior of the chamber.

The approximately rectangular shape of the ground plan of the chamber is evident from FIG. 3. The chamber is defined by the vertically arranged side walls 15, 16, 17, 18, by the floor 19 and by the cover 20 shown in broken fashion. As shall be set forth below, the wall 18 is fashioned as a pivotable ingot mold door.

Together with the floor 19 and the cover 20, the side walls 15, 16, 18 form a trough-shaped unit that is hinged to the stationary wall 17 as a chamber part that can be swivelled out. The swivel axis is referenced 21 and the swivelling direction is indicated by the arrow 40.

In the swivelled-opened position, the four side walls bear the reference numerals 22, 23, 24, 25. The cover in the swivelled-opened position is referenced with reference numeral 26. It may seem that articles inside the chamber can be reached very easily in the swivelled-open position. Merely by way of example, an induction coil with a melting crucible are schematically indicated and referenced 27. An ingot mold 28 is also shown. These and other articles located in the chamber are accessible from five different directions in the opened position of the chamber. That is, it is to be understood that the induction coil and melting crucible 27 and the ingot mold 28 are located on the table 3 which is attached to the stationary wall 17. In the swivelled-open position these objects can be manipulated from above, from the front or back directions, from the side direction and even from the direction of the stationary wall 17 in the sense that they are not positioned directly next to the stationary wall 17.

Such a high degree of accessibility and, thus, such ease of handling are established which has not been achieved in melting and casting plants of the prior art.

The vertical side wall 18 or 22 of the chamber is additionally fashioned as a door. This door can be swivelled out in the direction of the arrow 30 around the swivel axis 29. In the swivelled-opened position, the door is referenced with reference numeral 31.

When the chamber is opened on all sides, all articles in the chamber are freely accessible. A complete chamber cleaning is then possible and loading the chamber with ingot molds is simplified in comparison to the prior art. The same is true of the tamping of the crucible and for changing the coil of the induction furnace.

Figure 7:
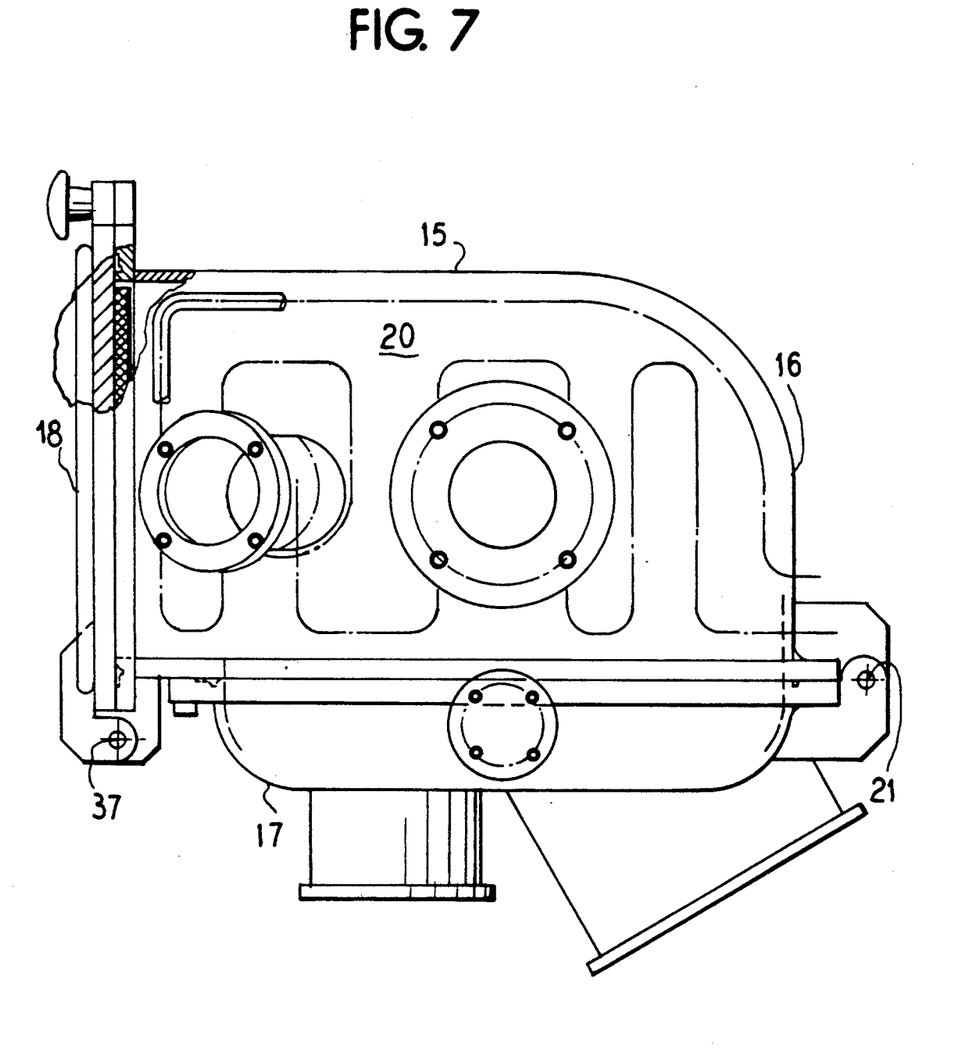
FIG. 7 is another top view of the FIG. 3 chamber.
Figure 8:
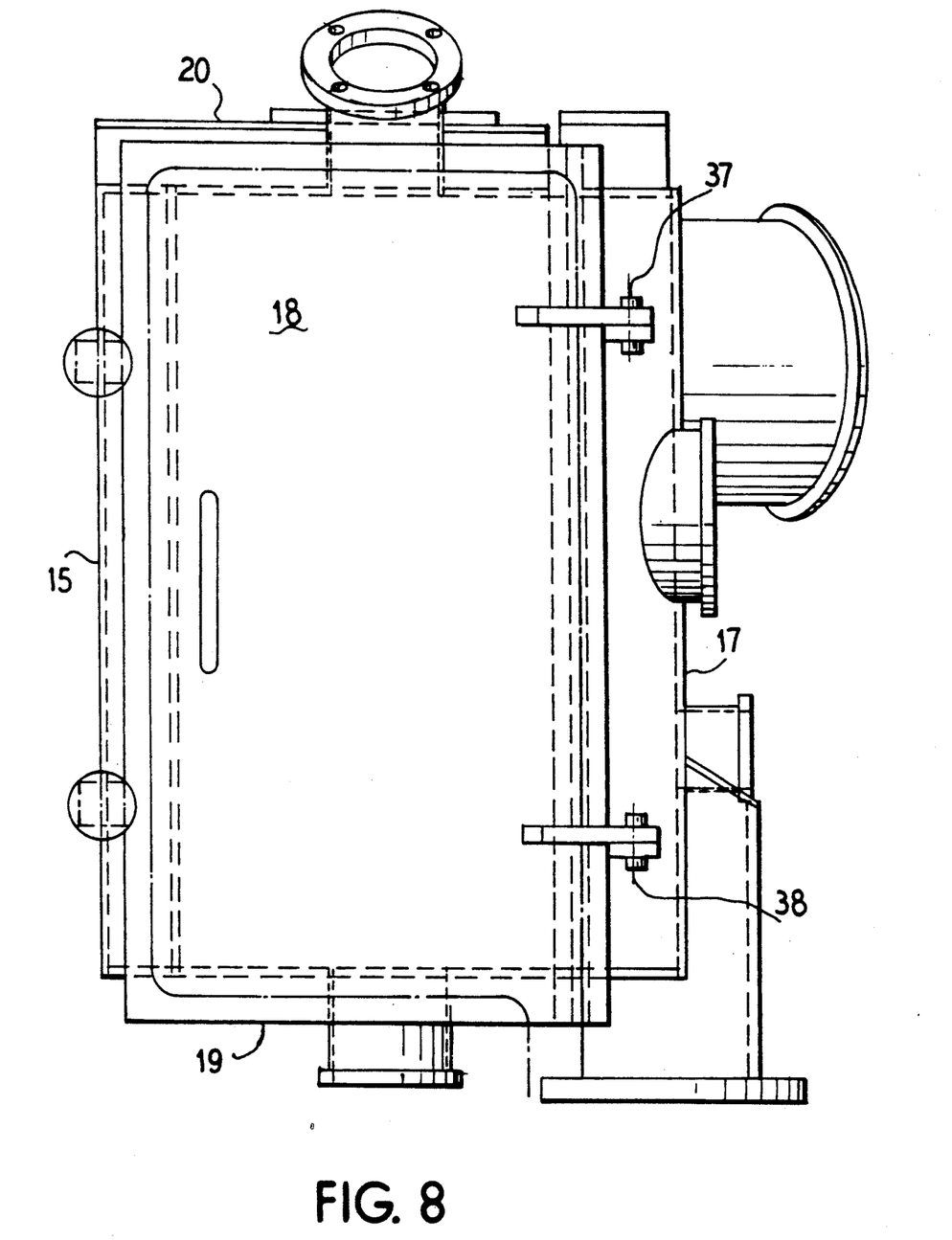
FIG. 8 is another front view of the FIG. 3 chamber.

FIGS. 7 and 8 show additional top and front views of the chamber 14 depicted in FIG. 3. FIGS. 6, 7 and 8 illustrate an alternative embodiment of the present invention in that the chamber 14 is only approximately rectangular in shape (see FIG. 6). In this embodiment the two side walls 15, 16 actually form a curved section of the chamber 14.

As initially set forth, the basic methods and apparatus components of the prior art as shown in FIG. 1 are used in the present exemplary embodiment. Thus, reference numeral 32 in FIG. 2 references an operating unit. The supply unit for the melting power has reference numeral 33 and the system for generating the vacuum and charging the chamber with the vacuum is referenced 34. Also included is a viewing glass 35, a charging mechanism 36 and an apparatus 41 for taking samples.

Figure 2:
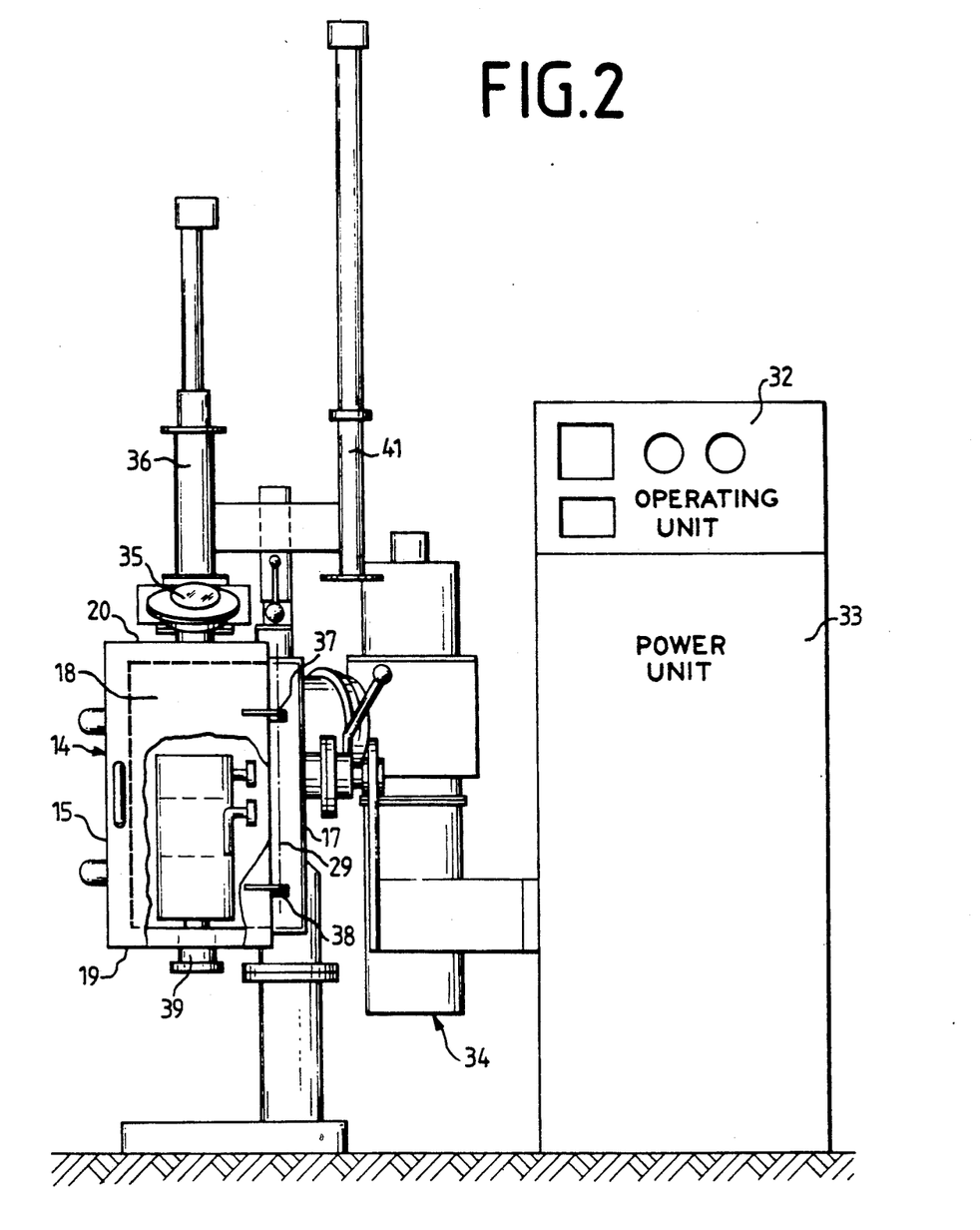
FIG. 2 shows a side view of an induction melting and casting plant that is equipped with a chamber in accordance with an exemplary embodiment of the present invention.

The side wall 18 which is fashioned as a door may be seen in FIG. 2, and is connected to the stationary chamber part 17 via hinge articulations 37, 38. The hinge articulations 37, 38 lie in the vertical axis 29 indicated with broken lines. Reference numeral 39 references the lower end of a turntable for one or more ingot molds. This table 39 can also be fashioned as an elevator/turntable. The ingot molds are brought into the desired positions with the table 39.

In an alternative exemplary embodiment, the door 18 which is hinged to the part 15, 16, 19, 20 of the chamber 14 can be hinged to wall 15 thereby placing the hinge position of the wall 15 at a set distance from the stationary wall 17, as shown in FIG. 3. The door 18 hinged to the swivellable part of the chamber 14 is provided with a hinge axis 42 that is located at the set distance from the stationary part 17 of the wall of the chamber (that is, the hinge axis 42 is located on the section of the swivellable part opposed from the stationary part 17) such that the door 18 when swivelled away moves away from the stationary part 17 of the wall of the chamber in accordance with the arrow 43 and proceeds into the position 44.

Equipping the chamber with ingot molds can be simply carried out through the opened door 18. The tamping of the crucible and the changing of the coil can also be performed in an easy fashion when the chamber is opened.

The application of the basic ideas of the present invention is not limited to induction melting and casting plants. It can also be used for other systems. For example, employment in systems of sintering process technology and general employment in systems for heat treatment methods is possible. The present invention can be used in vacuum furnaces, furnaces that are operated under a protective gas atmosphere, or furnaces that operate in a normal atmosphere. In addition to the induction heating, other types of heating, for example resistance heating, can be used.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A melting and casting plant for operation under one of a vacuum, a protective gas atmosphere or a normal atmosphere, and having a chamber for the acceptance of at least one melting and casting device, the chamber having a bipartite chamber wall, comprising the chamber wall having a substantially cuboid shape and composed of a stationary part and of a moveable part that can be swivelled away from the stationary part, the moveable part being hinged to the stationary part at a first swivel axis, the stationary part being a portion of the chamber wall that is substantially less in area than a portion of the chamber wall formed by the moveable part; the chamber wall and the first swivel axis fashioned and arranged such that, after the moveable part of the chamber wall has been swivelled away from the stationary part, the device in the chamber can be readily manipulated; the moveable part of the chamber wall having five walls and forming a trough-shaped unit that is hinged at the first swivel axis to the stationary part, the stationary part of the chamber wall being a sixth wall and the first swivel axis being a vertically oriented axis; and a door located in the moveable part of the chamber wall, the door being capable of being swivelled around a vertically oriented second swivel axis and being one wall of said five walls of said chamber wall.

2. The melting and casting plant according to claim 1, wherein the chamber wall and the swivel axis are fashioned and arranged such that, after the moveable part of the chamber wall has been swivelled away from the stationary part, the interior of the chamber is accessible from five different directions.

3. The melting and casting plant according to claim 1, wherein the door hinged to the moveable part of the chamber is provided with a hinge axis at the second swivel axis that, in a position of the swivellable part of the chamber wherein it is not swivelled out, is positioned adjacent to the stationary part of the chamber.

4. The melting and casting plant according to claim 1, wherein the door hinged to the moveable part of the chamber is provided with a hinge axis at the second swivel axis that is located at a wall of the swivellable part of the chamber that is opposed from the stationary part.

5. The melting and casting plant according to claim 4, wherein the door hinged to the swivellable part of the wall of the chamber is provided with the hinge axis that is located at a set distance from the stationary part of the wall of the chamber such that the door, when swivelled out, moves away from the stationary part of the chamber wall.

6. The melting and casting plant according to claim 1, wherein the melting and casting device includes an inductively heated melting crucible and one or more ingot molds.

7. The melting and casting plant according to claim 1, wherein the melting and casting device further includes at least one of a turntable and an elevating platform.

8. The melting and casting plant according to claim 1, wherein the device is located in an interior of the chamber.

9. The melting and casting plant according to claim 1, wherein the device is introduced into the chamber after the moveable part of the chamber is swivelled away.

10. The melting and casting plant according to claim 1, wherein the device is removed from the chamber after the moveable part of the chamber is swivelled away.

11. The melting and casting plant according to claim 1, wherein the device is treated in the chamber after the moveable part of the chamber is swivelled away.

12. The melting and casting plant according to claim 1, wherein the device is accessible for loading and unloading after the moveable part of the chamber is swivelled away.

* * * * *